United States Patent [19]

Mace

[11] Patent Number: 4,972,795

[45] Date of Patent: Nov. 27, 1990

[54] ANTENNA MARKER DEVICE

[76] Inventor: Timothy A. Mace, 6204 O'Bannon Dr., Las Vegas, Nev. 89102

[21] Appl. No.: 415,591

[22] Filed: Oct. 2, 1989

[51] Int. Cl.$^5$ .............................................. B60Q 9/00
[52] U.S. Cl. .................................. 116/28 R; 116/209
[58] Field of Search ...................... 116/28 R, 173-175, 116/209; 40/538, 586, 591, 592, 598

[56] References Cited

U.S. PATENT DOCUMENTS

| | | | |
|---|---|---|---|
| 1,789,466 | 1/1931 | Horni ...................................... | 40/607 |
| 3,075,492 | 1/1963 | Winfrey .............................. | 116/28 R |
| 3,240,183 | 3/1966 | Walter et al. ........................ | 116/173 |
| 3,371,647 | 3/1968 | Shopbell .............................. | 116/209 |
| 3,433,203 | 3/1969 | Sharkey et al. .................... | 116/28 R |
| 3,526,050 | 9/1970 | Weller ..................................... | 40/591 |
| 3,530,607 | 9/1970 | Willis ..................................... | 40/591 |
| 3,712,263 | 1/1973 | Faragosa ............................ | 116/28 R |
| 4,006,818 | 2/1977 | Wannyn ............................... | 206/564 |
| 4,038,552 | 7/1977 | Clofale ................................. | 250/462 |
| 4,417,613 | 11/1983 | Ryan et al. ......................... | 150/52 R |
| 4,526,820 | 7/1985 | Haas ....................................... | 428/31 |

Primary Examiner—William A. Cuchlinski, Jr.
Assistant Examiner—W. Morris Worth
Attorney, Agent, or Firm—Leon Gilden

[57] ABSTRACT

An antenna marker device is set forth for enhanced visibility of an individual's automobile as the device is secured to an uppermost terminal end of the antenna. The device is configured as a football helmet and alternatively provided with a goal post arrangement to provide enhanced visibility of the device and receive the antenna. The antenna is secured at the terminal end in the goal post by a plurality of opposed thumb screws axially aligned within the horizontal bar of the goal post.

1 Claim, 4 Drawing Sheets

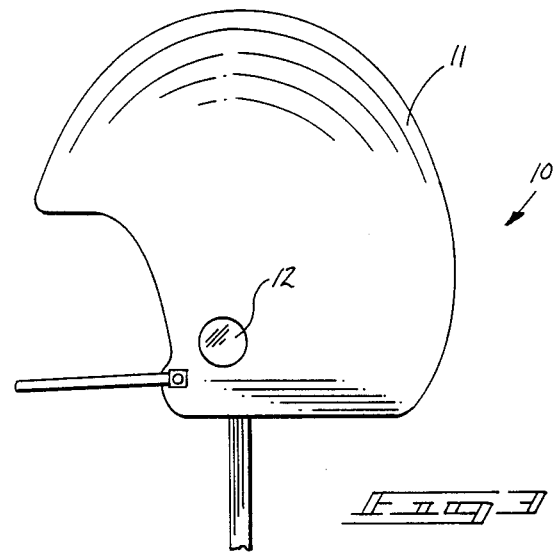
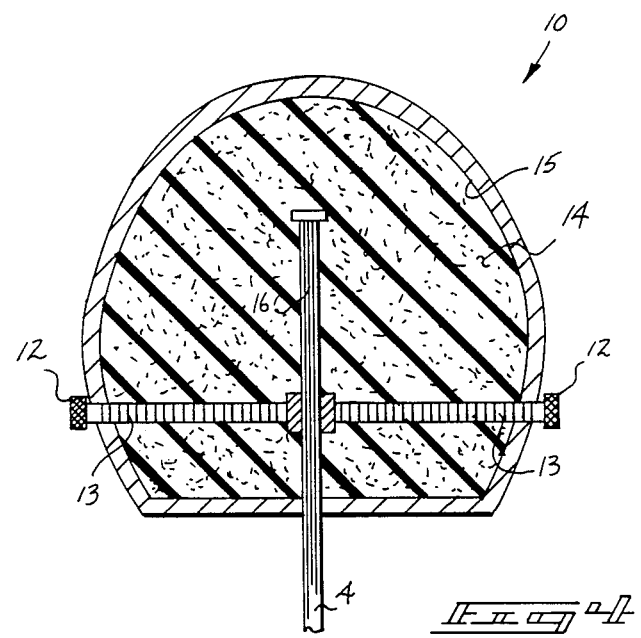

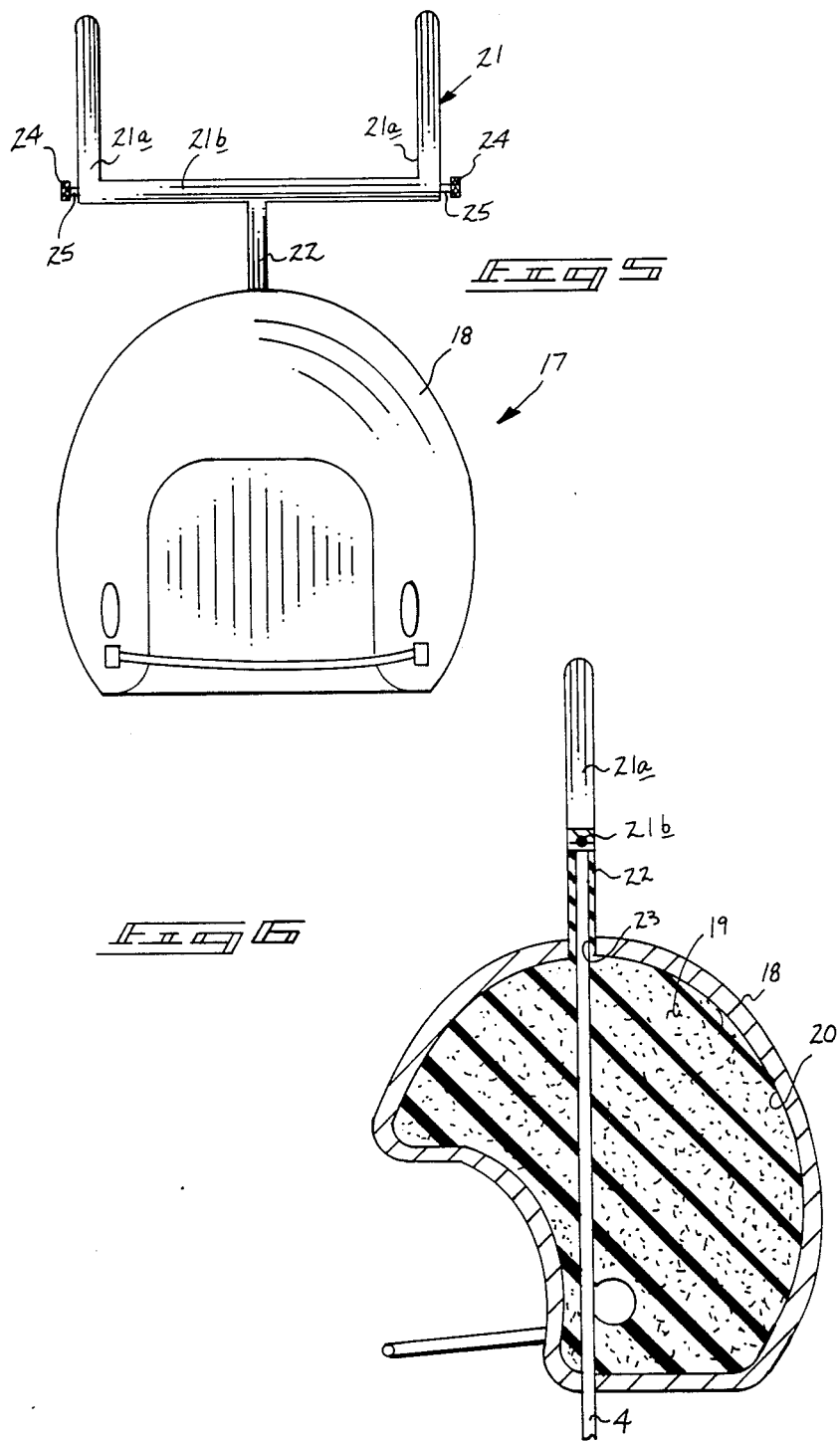

ANTENNA MARKER DEVICE

BACKGROUND OF THE INVENTION

1. Field of the Invention

The field of invention relates to antenna marking organizations, and more particularly pertains to a new and improved antenna marking device wherein the same is readily secured to an associated automobile antenna.

2. Description of the Prior Art

The prior art has utilized antenna markers for providing enhanced visibility of an antenna and its associated automobile, particularly in parking lot situations where a large gathering of automobiles makes it difficult for an owner to ascertain the position of the owner's automobile. The instant invention includes a football designation marker for inducing individuals to utilize the device and accordingly maintain visible association with their automobile. Examples of the prior art include U.S. Pat. No. 4,526,820 providing an elongate ornament formed with a hollow cavity to receive an antenna therewithin.

U.S. Pat. No. 4,417,618 to Ryan, et al., sets forth an enclosure for securing an antenna wherein, wherein the enclosure is a hollow configuration formed of two mirror image portions to secure a central member therewithin.

U.S. Pat. No. 8,712,268 to Faragosa sets forth an automobile antenna location signal wherein a brightly colored cylinder includes an aperture with a single clamping jaw to secure the cylinder in operative association with the antenna.

U.S. Pat. No. 4,038,552 to Clofale provides a luminescent device securable to a garment such as worn by an individual or to an umbrella transported by such an individual.

U.S. Pat. No. 4,006,818 to Wannyn sets forth a hinged package for receiving an article interiorly of the package, wherein the package includes mirror image cavities for receiving the article.

As such, it may be appreciated that the instant invention attempts to address the problems of the prior art by setting forth an automotive antenna marker device wherein the same provides ease of use of its affixing to an automotive antenna and simplicity of construction to effect its production and use by individuals and in this respect, the present invention substantially fulfills this need.

SUMMARY OF THE INVENTION

In view of the foregoing disadvantages inherent in the known types of antenna marker devices now present in the prior art, the present invention provides an antenna marker device wherein the same provides a football helmet member securably mountable to an automotive antenna for providing enhanced visible location of the antenna and associated automobile. As such, the general purpose of the present invention, which will be described subsequently in greater detail, is to provide a new and improved antenna marker device which has all the advantages of the prior are antenna markers and none of the disadvantages.

To attain this, the present invention includes a convex helmet-shaped member formed with a foam rubber filled internal cavity, wherein the foam rubber is adherably mounted interiorly of the helmet and is provided with a central cylindrical cavity medially oriented within the helmet to receive the antenna therewithin. Coaxially aligned thumb screws directed orthogonally through the helmet intersect the central cylindrical cavity to secure the antenna therewithin. A modification of the instant invention includes a goal post shaped member directed and affixed overlying the helmet with a central hollow support rod of the goal post coaxially aligned with a through-extending bore positioned at an upper end of the helmet to direct the antenna through the bore and into the hollow support rod with thumb screws axially directed through a horizontal support of the goal post to secure the antenna therewithin.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claim he regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patents or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved antenna marker device which has all the advantages of the prior art marker devices and none of the disadvantages.

It is another object of the present invention to provide a new and improved antenna marker device which may be easily and efficiently manufactured and marketed.

It is a further object of the present invention to provide a new and improved antenna marker device which is of a durable and reliable construction.

An even further object of the present invention is to provide a new and improved antenna marker device which is susceptible of a low cost of manufacture with regard to both materials and labor, and which accordingly is then susceptible of low prices of sale to the consuming public, thereby making such antenna marker devices economically available to the buying public.

Still yet another object of the present invention is to provide a new and improved antenna marker device which provides in the apparatuses and methods of the prior art some of the advantages thereof, while simultaneously overcoming some of the disadvantages normally associated therewith.

Still another object of the present invention is to provide a new and improved antenna marker device wherein the same is selectively and effectively secured to an upper terminal end of an associated automotive antenna.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic view taken in elevation of the instant invention.

FIG. 4 is an orthographic cross-sectional view of the instant invention.

FIG. 5 is an orthographic view taken in elevation of a modification of the instant invention.

FIG. 6 is an orthographic cross-sectional view of the modification of the instant invention as set forth in FIG. 5.

DESCRIPTION OF THE PREFERRED EMBODIMENT

Figure 1:
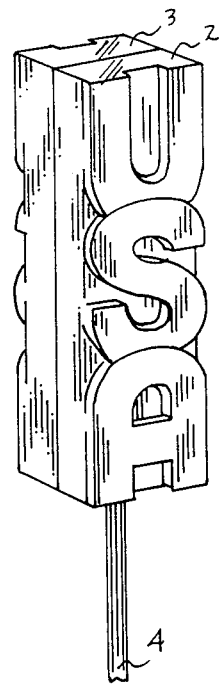
FIG. 1 is an isometric illustration of a prior art antenna marker device.

With reference now to the drawings, and in particular to FIGS. 1 to 8 thereof, a new and improved antenna marker device embodying the principles and concepts of the present invention and generally designated by the reference numerals 10 and 17 will be described.

Figure 2:
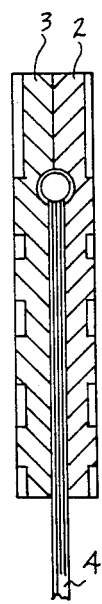
FIG. 2 is a cross-sectional orthographic view of &he prior art device as set forth in FIG. 1.

More specifically, the antenna marker device 10 essentially comprises an improvement over the prior art that is exemplified in FIGS. 1 and 2, wherein a prior art antenna cap 1 is formed of a first and second portion with an internal cavity each defined by a semi-cylindrical cavity to receive the antenna 4 therewithin in a complementary configuration.

The antenna marker device 10 of the instant invention includes a convex football helmet 11 formed of a rigid material with a pair of thumb screws 12 coaxially aligned relative to one another directed through opposed sides of the football helmet 11 positioned through the sides of the football helmet within threaded apertures formed within the football helmet that are coaxially aligned with one another. The thumb screws 12 are formed with threaded shanks 18 at forward terminal ends, as illustrated in FIG. 4 for example. The helmet is formed with an internal helmet cavity 15 that is filled with a foam rubber core 14. The core 14 may be laminated interiorly of the helmet 11. The core 14 is further formed with a vertical medially oriented central cylindrical cavity 16 to receive the antenna 4 therewithin. Upon positioning of the antenna 4 within the central cylindrical cavity 16, the thumb screws 12 are tightened relative to one another and inasmuch as the thumbscrews axes orthogonally intersect the defined axis of the central cylindrical cavity 16, the forward tips of the threaded shanks 13 of the thumb screws engage opposed sides of the antenna 4 interiorly of the helmet. In this manner, the marker device 10 is selectively secured to the antenna 4 as desired.

Figure 7:
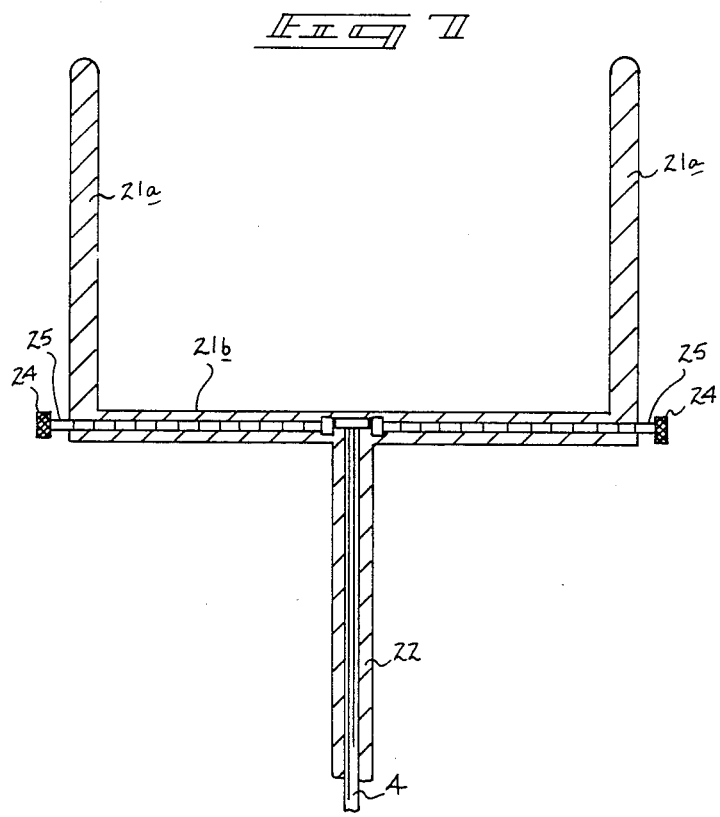
FIG. 7 is an orthographic cross-sectional view of the goal post portion of the modified antenna marker device of FIG. 5.
Figure 8:
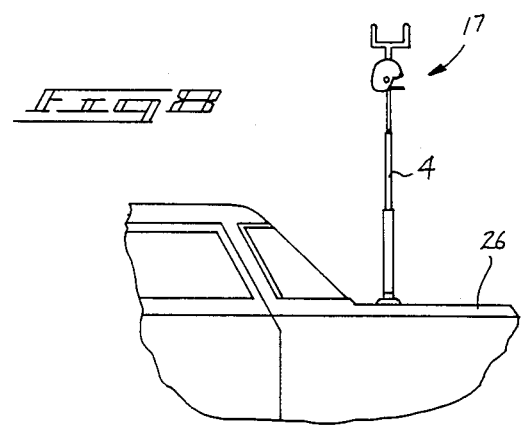
FIG. 8 is illustrative of the antenna marker device secured to an associated automotive antenna in relationship to the automobile.

FIGS. 5 through 8 illustrated a modified antenna marker 17 formed with a comparable rigid helmet shell exterior 18 with a foam rubber interior core 19 positioned within the helmet cavity 20 defined by the rigid helmet 18. The helmet 18 is in a conventional convex exterior configuration and in the embodiment of FIGS. 1 through 8 includes a "U" shaped goal post positioner 21 orthogonally directed and secured to an uppermost surface of the helmet 18. The goal post positioner 21 includes parallel legs 21a of solid construction with a horizontal support 21b interconnecting lowermost terminal ends of the parallel legs and orthogonally secured to the lowermost terminal ends of the parallel legs 21a, wherein the horizontal support 21b is internally threaded to receive opposed coaxially aligned thumb screws 24. The horizontal support 21b includes a hollow support rod 22 orthogonally and integrally secured somewhat medially of the horizontal support 21b and directed downwardly therefrom, as illustrated in FIGS. 5 through 7. The foam rubber core 19 includes a central cylindrical cavity directed through the core and coaxially aligned with the hollow support rod 22 wherein a through-extending bore 28 is formed through the rigid helmet 18 aligned with the cylindrical cavity formed within the foam rubber core 19 and the hollow support rod 22. Upon directing of an antenna 4 through the foam rubber core 9, then through the through-extending bore and interiorly of the hollow support rod 22, the upper end of the antenna 4 is positioned within the horizontal support 21b. Tightening of the opposed coaxially aligned thumb screws 24 secures the upper terminal end of the antenna within the modified antenna marker 17 as illustrated in FIG. 7 for example. Securement to the vehicle 26, as illustrated in FIG. 8, enables orientation of the antenna marker as desired, dependent upon the disposition of the rigid helmet upon the antenna prior to its securement and tightening of the thumb screws 24.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the United States is as follows:

1. A vehicular antenna marker for securement to a vertically oriented antenna of an associated vehicle, the marker comprising, a single rigid exterior casing defining an interior cavity therewithin, an insert member secured within the cavity and including a medially oriented bore, the bore defining a cylindrical cavity of a complimentary configuration to the antenna, and securement means cooperating with the bore to secure the antenna within the bore, and wherein the insert member is defined as a flexible foam rubber insert member, and "U" shaped goal post member with a hollow support rod integrally mounted to an upper end of the casing overlying an aperture in the casing, the aperture aligned with the bore, and the hollow rod coaxially aligned with the aperture and the bore, and the goal post member including spaced parallel legs with a central horizontal support integrally mounted to lower terminal ends of each leg, and the securement means including a plurality of thumb screws coaxially aligned relative to one another through opposed openings of an internally threaded coaxial bore through the horizontal support, wherein the thumb screw members include threaded shanks threadedly received within the coaxial bore of the horizontal support with forward terminal ends of the threaded shanks arranged for securing an upper terminal end of the antenna therebetween, and each of the plurality of thumb screws extend outwardly beyond thte horizontal support.

* * * * *